United States Patent Office 3,703,379
Patented Nov. 21, 1972

3,703,379
DOUBLE EXPANDED FOOD PRODUCTS
Patricia D. Cummisford, Minneapolis, and Charles I. Beck, Wayzata, Minn., assignors to General Mills, Inc.
No Drawing. Filed July 27, 1970, Ser. No. 58,734
Int. Cl. A23l 1/10, 1/18
U.S. Cl. 99—81                         8 Claims

ABSTRACT OF THE DISCLOSURE

A method is disclosed for preparing a food product such as a snack, a confection or a toast-like food base. The food product is prepared by extrusion expanding a mixture including lipid and flour to provide a food piece having a plurality of large voids surrounded by thick walls. The food piece is then subjected to a secondary expansion such as by deep fat frying, microwave or salt puffing thereby puffing or expanding the walls.

BACKGROUND OF THE INVENTION

The present invention relates to a new and improved expanded food product and more particularly relates to a method for producing such a product by double expansion. The product may be typically used as a snack or a confection.

Snack and cereal products have been commonly puffed or expanded in the past by any of various methods including extrusion, fat frying, salt puffing and hot air puffing. In the known methods for extruding a snack or ready-to-eat cereal, flour, such as wheat or rice flour, is mixed with water to form a dough which is worked in a screw extruder. The screw applies a substantial amount of work to the dough raising the temperature of the dough to a point at or above 212° F. The dough is then extruded, water flashes off and the flour based product expands. Another conventional method for preparing a puffed snack includes mixing flour material such as corn, wheat, oats, barley, rye or other cereal with water and cooking the dough such as in a steam jacketed cooker. The cooked dough is extruded under low pressure so that there is little or no puffing during extrusion. The extrudate may be cut into pieces and then expanded such as by deep fat frying.

The present invention provides an improved product in which the material is produced using two expansion steps. The first expansion step includes extruding a dough under conditions, typically, a temperature of about 275 to 300° F. and a pressure of 200 to 300 p.s.i.g., such that the extrudate has large cells or voids surrounded by relatively thick walls, for example, 0.015 to 0.040 inch. The voids, for example, may be somewhat spherical in shape and may have a diameter of ⅛ to ¼ inch. The extruded material is tempered to adjust the moisture content to about 10 to 12% and then again expanded. The second expansion may be carried out using heat puffing techniques, preferably deep fat frying or microwave puffing. Other heat puffing techniques that may be used include salt puffing or oven puffing. In the second expansion step, the thickened walls are expanded and acquire a large number of small voids thereby resulting in an edible expanded food product with excellent friability and mouthfeel.

The dough used in the present invention includes a flour such as wheat flour, corn flour, rice flour, dry potato materials, etc. in an amount of from 45 to 75%. The dough includes a total moisture content in an amount of from 20 to 50% and flavoring such as salt. The dough includes an expansion controlling material, namely an edible lipid.

The expansion controlling agent is preferably a vegetable oil such as coconut oil, peanut oil, cottonseed oil, corn oil or the like and may be present in an amount of from about 2.0% to 6.0% based on the weight of the dough. The dough preferably contains about 5% oil. Other oils or fats that may be used would include hydrogenated cottonseed oil and hydrogenated peanut oil. Of course, various other lipids such as edible oils and oil-like materials, typically phospholipids such as lecithin, may be used.

The expansion controlling agent does not eliminate expansion but rather reduces the number of voids in the product thereby resulting in much larger voids. The larger voids are highly advantageous in many use situations. When the expanded rope is cut into pieces, many of the voids are opened such that they may receive coating and filling material. For example, excellent candy-like snacks can be provided by coating the double expanded product with a conventional soft-fat based chocolate coating. In this instance many of the large voids are filled with chocolate material much like honeycombs are filled with honey. Cheese type snacks may be provided by thinly coating the double expanded product with a cheese material. In this instance not only the outside of the snack but also many of the inner walls surrounding the open voids would be coated with cheese. The double expanded pieces may be used as a toastlike base for such foods as chicken a la king. In this instance many of the voids would be filled with the sauce. When the double expanded pieces are eaten without a special coating, they have a unique texture and eating quality not found in previous snack or food products.

The following examples are intended for purposes of illustrating the present invention and are not intended as limitations.

EXAMPLE I

Double expanded edible food pieces suitable for use as a toast-like food base were prepared according to the present invention. A mixture was prepared including 94.5 parts flour (soft wheat second clears), 5 parts coconut oil, 0.5 part sodium chloride. The terms "parts" and "percents" as used herein will mean parts or percents by weight unless specifically stated otherwise. The mixture was fed to a Sprout Waldron extruder at the rate of about 7 pounds per minute. The extruder was operated at a rate of about 240 r.p.m. The total moisture content of the mixture was raised to about 30% in the extruder by adding water. The temperature of the product at the die plate was about 290° F. The extrusion pressure was about 250 p.s.i.g. The orifice had a cross sectional area of about 0.12 square inch. The extruded rope was about 1¼ inches square and thus the product expanded about 10 times upon extrusion. The extruded rope was coarse celled or in other words had a plurality of large voids such as ⅛ to ¼ inch in diameter. The rope in cross section looked much like a honeycomb and the cells or voids were surrounded by thickened walls having an average thickness of about 0.026 inch. The extruded rope was cut after about 1 min. into pieces about ⅜ of an inch in length and the pieces were permitted to cool. The moisture content of the cooled pieces was about 19% before drying. The cooled pieces were found to be hard, tough and vitreous or glasslike, and therefore very difficult to eat. The pieces were dried to about 10 to 12% moisture and placed for 7 to 10 seconds in an oil bath having a temperature of about 180° C. The deep fat frying changed the structure of the pieces by puffing or expanding the thick walls thereby providing a crisp, tender and easy to chew product. Examination of the walls showed that they had acquired many small voids. The pieces were found to be highly satisfactory when used as a toast-like base for chicken a la king.

EXAMPLE II

Double expanded edible food pieces were prepared according to the present invention suitable for use as a snack base. An extruded rope as described in Example I was cut into pieces about ⅜ of an inch in length. The hard, tough pieces were placed in an oven drier-puffer in a stream of hot air at 350° F. for five minutes. The thick walled structure of the pieces was expanded producing a crisp, tender product. The pieces were suitable for coating with a soft, fat based chocolate covering of the type conventionally known as a summer coating.

EXAMPLE III

Double expanded food pieces were prepared according to the present invention using microwave puffing. An extruded rope as described in Example I was cut into pieces about ⅜ of an inch in length. One-half of a piece was placed in a microwave oven for puffing. The power source was a Litton Microwave Power Source Model TR-103-5. The wave guide applicator was a standard S band wave guide with choked access. The piece was illuminated at the geometric center of the cross section at a high field intensity. The piece was puffed in less than 2 seconds with 1 kilowatt of absorbed power. The piece exhibited double expansion and was crisp and tender.

EXAMPLE IV

This example illustrates various materials that may be used in preparing the food product of the present invention. Sample A was prepared using 95% soft wheat second clears (produced by General Mills, Inc. under the designation Golden Crust®) and 5% coconut oil. The material was extruded under the conditions shown in Table I using a Sprout Waldron® extruder. The die was star-shaped having a ¼ inch center hole with four radiating points. The maximum dimension across opposite points was 17/32 inch. The extruded rope, which was about 1¼ inches square, was cut into pieces about ⅜ inch in length and had a coarse open structure. When deep fat fried at 380° F. the pieces exhibited the characteristic secondary puffing or double expansion. That is, the membranes or walls around the air cells became blistered and foamed. The product became whiter and less translucent. The texture of the fried product was crisp but tender and easily eaten. Sample B was prepared much like Sample A except that the 5% coconut oil was replaced with 5% of a mixture including 1 part Mazola® corn oil and 9 parts lecithin (produced by A. E. Staley Mfg. Co. under the designation Sta-Sol® type UF). Double puffing was observed in this product. Sample C was prepared the same as Sample A except that the wheat was replaced with corn meal of the type produced by Krause Milling Co. under the designation Degermed Yellow Corn Cones®. The final deep fat fried product was double puffed and was golden yellow in color. The product was tender and tasted somewhat like popcorn. Sample D was prepared the same as Sample A except that the wheat was replaced with rice flour of the type produced by Comet Rice Co. under the designation Comet Rice Flour®. The product was double puffed, tender and bland. Sample E was prepared the same as Sample A except that the wheat was replaced with flour of the type produced by General Mills, Inc. under the designation Softasilk® Flour. The deep fat fried product was very similar to Sample A.

TABLE I.—EXTRUDER OPERATING CONDITIONS

| | Sample | | | | |
|---|---|---|---|---|---|
| | A (wheat) | B (wheat) | C (corn) | D (rice) | E (Softasilk®) |
| R.p.m. | 238 | 215 | 240 | 215 | 215 |
| Motor load, percent (50 hp. motor) | 60 | 70 | 110 | 125 | 60 |
| Temp. at die, °F | 294 | 295 | 312 | 350 | 305 |
| Water rate, #/min | 2.04 | 1.80 | 2.30 | 2.00 | 1.95 |
| Feed rate, #/min | 7.6 | 7.2 | 7.1 | 7.0 | 7.0 |
| Lipid rate, #/min | .375 | .43 | .386 | .55 | .43 |

The embodiments of the invention in which an exclusive property or privilege is claimed are defined as follows:

1. A method for preparing an expanded, edible food product comprising:
   preparing a mixture including from 45 to 75% flour and from 2 to 6% of an expansion controlling lipid material, said mixture having a total moisture content of from 20 to 50%;
   extruding said mixture to provide an expanded rope product having large cells and thickened walls, the diameter of said cells being from ⅛ to ¼ inch and the thickness of said walls being from 0.015 to 0.040 inch;
   cutting said rope to provide pieces, each of said pieces having a plurality of large open cells;
   tempering said expanded product; and
   then heat expanding said thickened walls to produce a double expanded product.

2. The method of claim 1 wherein said expansion controlling material is an edible oil.

3. The method of claim 2 wherein said heat expanding step is carried out by deep fat frying.

4. The method of claim 2 wherein said heat expanding step is carried out by salt puffing.

5. The method of claim 2 wherein said heat expanding step is carried out by microwave puffing.

6. The method of claim 1 wherein said expansion controlling material is phospholipid.

7. The method of claim 1 wherein said flour is selected from the group consisting of wheat, corn and rice.

8. The method of claim 1 wherein the lipid material is a hydrogenated oil or fat.

References Cited
UNITED STATES PATENTS

| 2,162,376 | 6/1939 | Collatz | 99—82 |
| 3,054,677 | 9/1962 | Graham et al. | 99—82 |
| 3,462,276 | 8/1969 | Benson | 99—81 |
| 3,104,975 | 9/1963 | Bowman | 99—81 |
| 3,246,990 | 4/1966 | Thompson et al. | 99—82 |

RAYMOND N. JONES, Primary Examiner